Jan. 24, 1961     T. L. ATKINSON     2,969,155
LOCKING JOINT FOR RACKS
Filed June 2, 1958
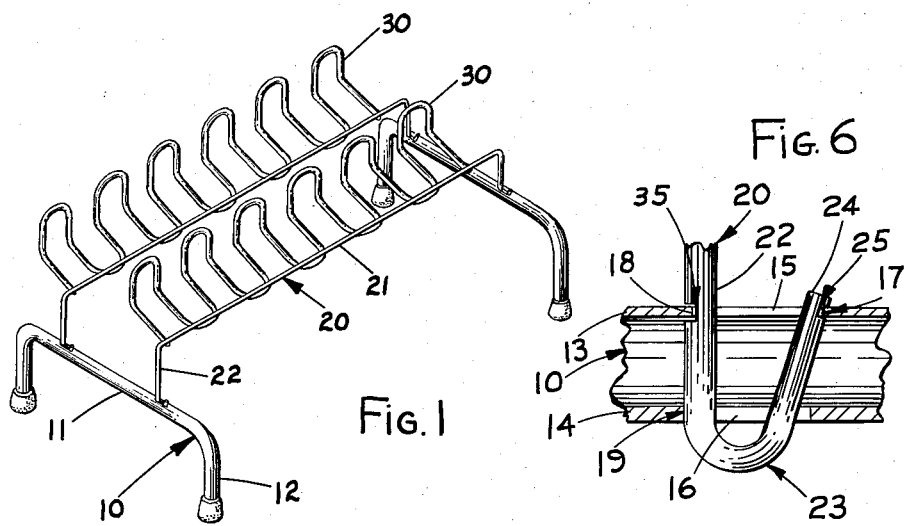
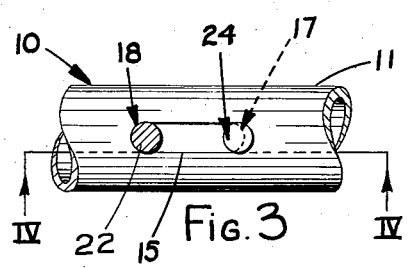
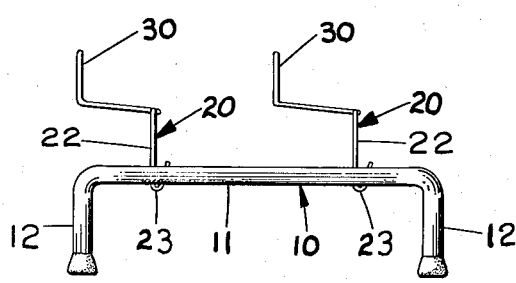
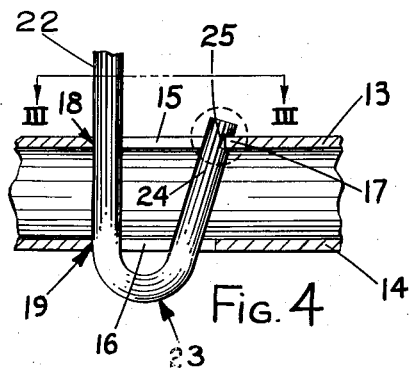
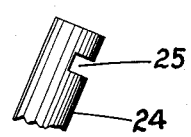
INVENTOR.
TRUMAN L. ATKINSON
BY
ATTORNEYS United States Patent Office 2,969,155
Patented Jan. 24, 1961

2,969,155

LOCKING JOINT FOR RACKS

Truman L. Atkinson, Ludington, Mich., assignor to Atkinson Manufacturing Company, Ludington, Mich., a corporation of Michigan Filed June 2, 1958, Ser. No. 739,215

5 Claims. (Cl. 211—177)

This invention relates to a locking joint for racks. More particularly, this invention relates to a means for attaching article supporting bars to their standards.

Many types of racks for supporting or hanging various articles are already in existence. These racks are of substantial size when assembled, although the actual mass of the rack itself is relatively small. Thus, it is extremely impractical to ship these racks in assembled form because of the size of the shipping carton needed and the space they occupy during transit. There is also a great possibility of the racks being crushed in transit and thereby damaged unless a great deal of care is taken in packing them. These factors create a necessity for shipping the racks in disassembled or knocked-down condition, thereby greatly reducing the size of the carton and the space it occupies. This allows each part to lie in a relatively flattened position during transit, to a great extent eliminating the chance of damage.

The shipping of these racks in knocked-down condition necessitates their being assembled at the end of transit. This task usually falls on the consumer who eventually purchases such a rack, as he will be given the same carton used for shipment of the parts. The racks presently in existence create a number of problems for this purchaser. First of all, some sort of threaded connection is used in attaching the supporting bar to the standard, usually in the form of screws. This requires proper tools to carry out the assembly.

Secondly, there are many inherent disadvantages with a threaded connection. These racks are subject to much abuse during their lifetime of use, a shoe rack being an example. Shoes are often forced on or pulled off in a rough and hurried manner. This will inevitably cause the threaded connection to loosen, necessitating the tightening thereof, and eventually the connection will be worn to such an extent that a tight and firm connection is impossible. The rack then ceases to function desirably as the supporting bar will wobble on the standards. It is an object of this invention to provide a locking joint which maintains a firm connection as long as the rack is in use.

Another object of this invention is to provide a rack with a locking joint for the supporting member which enables it to be attached to standards without the use of tools.

Another object of this invention is to provide a locking joint for racks which is extremely rigid and free of play at all times.

A further object of this invention is to provide a durable locking joint for racks characterized by economy of manufacture.

Other objects of my invention will become obvious to those skilled in the design and manufacture of racks upon reading the accompanying specification and examination of the accompanying drawings.

In the drawings:

Fig. 1 is a perspective view of an assembled rack embodying my locking joints.

Fig. 2 is a side elevation of the assembled rack shown in Fig. 1.

Fig. 3 is an enlarged fragmentary sectional view of my locking joint taken along the plane III—III of Fig. 4.

Fig. 4 is an enlarged fragmentary sectional view of my locking joint taken along the plane IV—IV of Fig. 3.

Fig. 5 is an enlarged fragmentary side view of the encircled area of Fig. 4, showing the slot in the end of the support member.

Fig. 6 is an enlarged fragmentary sectional view of a modified locking joint taken along the same plane as Fig. 4.

Briefly, this invention consists of an improved locking joint for attaching a support member to its standard. The end of the support member is bent over upon itself to form a generally U-shaped hook, and a slot is formed at the free end of the hook. This slot opens away from the body of the support member. A standard of the type having two generally parallel walls, such as a tubular member, is utilized, and elongated openings are formed in each wall. These openings are of a width which slidably receives the hook on the end of the support member and of a length slightly less than the spacing of the free end of the hook from the body of the support member. Thus, the hook is forced through the openings, the slot snaps into engagement with an end of one of the openings, and the support member is clamped in an extremely rigid position. The factors producing this rigidity will be fully described hereinafter.

Referring to the drawings, the numeral 10 designates the standards for a rack, shown in Figs. 1 and 2. The support bars 20 are mounted on the standards and the holding members 30 are attached to the support bars, as shown in Fig. 1.

The standards 10 are illustrated in the drawings as being of a tubular construction and shaped like an inverted U, with a generally horizontal portion 11 supported by the legs 12. These standards may be of any preferred construction, and I have shown only one exemplary embodiment thereof. The horizontal sections 11 of the standards 10 have two opposite walls or sides 13 and 14 lying generally parallel to each other, 13 being the top side and 14 the bottom side of horizontal portion 11. The elongated openings 15 and 16 are formed in the sides 13 and 14, respectively. The ends of opening 15 are designated at 17 and 18. One end of opening 16 corresponds to end 18 of opening 15 and is designated at 19. The size and purpose of these openings will be fully described hereinafter.

The support bars 20 are also shown to be of a tubular construction and shaped like an inverted U, with a generally horizontal portion 21 and legs 22. These support bars may be fabricated from any material possessing a slightly resilient quality. The particular shape of the support bars is not important to my invention, I have simply shown one possible embodiment. Each end of each support bar is bent over upon itself to form a generally U-shaped hook 23, the free end 24 thereof diverging away from the leg 22. In the embodiment of the rack I have shown to describe my invention, the ends of the support bars 20 are bent in a direction perpendicular to the horizontal portion 21 thereof. A slot 25 is cut in the free end 24 of the hook 23, the slot lying on the side of the free end 24 away from the leg 22.

The size of the openings 15 and 16 is important to my invention. These openings are of a width such as to slidably receive the U-shaped hooks 23. They are of a length slightly less than the spacing of the free end 24 from the leg 22. It should be noted that the length of opening 16 is not important so long as it is long enough to freely allow insertion therethrough of hook 23. It is, however, suggested that the openings be of equal length as this necessitates only one operation in forming them. It will now be noted that all that is necessary in order to attach a supporting member 20 to standards 10 is to slide the hooks 23 into openings 15, force the hook through the opening until they snap into and engage the ends 17 of openings 15 by means of slots 25, and the hook extends down through opening 16.

The positioning of the opening 15 relative to the opening 16 is also important to this invention. The positioning of the ends 18 and 19 of openings 15 and 16, respectively, determines the angular relationship of the support bar 20 to the horizontal portion 11 of the standard 10. To obtain a perpendicular relationship between the leg portion 22 of support bar 20 and the horizontal portion 11 of standard 10, the end 19 of opening 16 must lie directly below end 18 of opening 15, as shown in Fig. 4. Although the openings need not necessarily be the same size, ends 18 and 19 thereof must be positioned as shown so that the legs of the support bar are positioned perpendicular to the horizontal portion of the standards. It will now be noted that the hook 23 engages the standard at three points, ends 17 and 18 of opening 15 and end 19 of opening 16. This three point engagement produces the desired rigidity, slot 25 serving as a locking means.

Any one of numerous types of holding members 30 may be attached to support bar 20. It should be noted that no holding member would be necessary if the rack were to be used for hanging items, such as towels. I have shown a member adapted to hold shoes. However, any hook can be employed, depending upon the use to which the rack is to be subjected.

Thus, racks utilizing my locking joint are extremely easy to fabricate at the location of production, and very easy to assemble when put into use. The standards 10 and support bars 20 may be fabricated from lengths of ordinary tubular material. The elongated openings 15 and 16 may be formed in the standards 10 in a single operation. The ends of support bars 20 are bent in a U-shape to form the hooks 23, and a slot 25 may be pressed out of the free ends 24 of hooks 23. Any suitable type of holding member 30 is attached to the support bars 20, if the proposed use of the rack demands a holding member, and the parts of the rack are then ready to be compactly shipped to their destination. To set up the rack, one needs no tools, he simply snaps the hooks 23 of the support bars 20 into the openings 15 and 16 of the standards 10. The rack is then ready to use.

The fabrication of such a rack is very easy, enabling the racks to be produced at a minimum cost. The rack is simple to assemble when it is to be put into use, no tools being needed. To disassemble, one merely depresses the free end 24 of hooks 23 toward the leg 22 of the support bar and removes the support bar. There are no threaded connections to wear during rough use. The connection is always extremely rigid because the support bar is braced against lengthwise movement in the standard by three point contact, the three points being both ends of the opening in the top of the standard and one end of the opening in the bottom of the standard. The resiliency of the hook assures contact at these three points, and the slot in the free end of the hook prevents disengagement. The support bar is braced against side movement relative to the standard because the width of the openings and the width of the hooks are the same size and embrace the hook at two points spaced lengthwise of the leg portion 22. Because the support members are fabricated of a resilient material, and the slot in the free end of the hook firmly engages one end of the opening in the top of the standard, the connection remains rigid during long, continued, rough use, thus causing the structure to be very durable.

Fig. 6 illustrates a modification of this invention. In this construction, the same elongated openings 15 and 16 are used in the opposite walls or sides 13 and 14 respectively of the standard 10. The ends of opening 15 are designated 17 and 18. The end of opening 16 corresponding to end 18 of opening 15 is designated 19. The hooked shaped end 23 of the support bar 20 has a free end 24 diverging from the leg 22. The free end 24 has a notch 25 and the leg 22 has a notch 35. The notches 25 and 35 open away from each other.

When the support bar 20 is secured to the standard 10, the notch 25 engages end 17 and the notch 35 the end 18 of the opening 15. The end of the leg 22 adjacent the apex of the hook 23 bears against the end wall 19 of the opening 16. This construction provides additional stability for the joint by utilizing a positive lock to prevent rocking in either direction rather than depending partially upon the rigidity of the material.

The fact that I have described my invention as applied to a shoe rack is not to be considered as a limitation upon the scope of my invention. It is merely illustrative of a particular application for the invention.

Having described my invention, it should be understood that although I have shown and described one embodiment thereof, it can be practiced by altering it or adapting it to other embodiments. Such embodiments as do not depart from the scope of my invention are included unless the accompanying claims expressly state otherwise.

I claim:

1. In a rack having a standard and an article supporting bar, the improvement comprising: said standard having spaced generally parallel walls; said bar having a body portion and an end bent over upon itself to form a generally U-shaped hook, the legs of said U being biased into a substantially divergent position; said walls each having an elongated opening therein of a width to slidably receive said hook, said openings being aligned; said hook being received through both of said openings and compressively held against said bias by the ends of one of said openings; the free end of said hook being notched to receive an end of said one opening; said body portion being pressed against the other end of said one opening and against the aligned end of the other of said openings for detachably and firmly securing said bar to said standard.

2. In a rack having a standard and an article supporting bar, the improvement comprising: said standard having spaced generally parallel walls; said bar fabricated from a resilient material having a body portion and an end bent over upon itself to form a generally U-shaped hook, the legs of said U being biased into a substantially divergent position; said walls each having an elongated opening therein of a width to slidably receive said hook and of a length less than the spacing of the free end of said hook from the body portion of said bar, said openings being aligned; said hook being received through both of said openings and compressively held against said bias by the ends of one of said openings; the free end of said hook being notched to receive an end of said one opening; said body portion being pressed against the other end of said one opening and against the aligned end of the other of said openings for detachably and firmly securing said bar to said standard.

3. In a rack having a standard and an article supporting bar, the improvement comprising: said standard having spaced generally parallel walls; said bar having a body portion and an end bent over upon itself to form a generally U-shaped hook, the free end of said hook being biased into divergence from said body portion thereof; said walls each having an elongated opening therein of a width to slidably receive said hook, said openings being aligned; said hook being received through both of said openings and compressively held against said bias by the ends of one of said openings; the free end of said hook being notched to receive an end of said one opening; said body portion being pressed against the other end of said one opening and against the aligned end of the other of said openings for biasing said body portion into an upright position, said body-portion-pressing ends constituting bearing points and said notch constituting a fulcrum.

4. In a rack having a pair of standards and an article supporting bar, the improvement comprising: each of said standards having spaced generally parallel walls; said bar having a body portion and each of its ends bent over upon itself to form generally U-shaped hooks, the legs of said U being biased into a substantially divergent position; said walls of said standards each having an elongated opening therein of a width to slidably receive one of said hooks and of a length less than the spacing of the free end of one of said hooks from the body portion of said bar, said openings in each of said standards being aligned; one of said hooks being received through both of said openings in one of said standards, the other of said hooks being received through both of said openings in the other of said standards, the end of one of said openings in each of said standards compressively holding the respective hooks against said bias; the free end of each of said hooks being notched to receive an end of each of said one openings; said body portions of said hooks being pressed against the other end of each of said one openings and against the aligned ends of the other of said openings in each of said standards for detachably and firmly securing said bar to said standards.

5. In a rack having a standard and an article supporting bar, the improvement comprising: said standard having spaced generally parallel walls; said bar having a body portion and an end bent over upon itself to form a generally U-shaped hook, the legs of said U being biased into a substantially divergent position; said walls each having an elongated opening therein of a width to slidably receive said hook, said openings being aligned; said hook being received through both of said openings and compressively held against said bias by the ends of one of said openings; the free end of said hook being notched to receive an end of said one opening; said body portion having a second notch to receive the other end of said one opening and being pressed against the other end of said one opening and against the aligned end of the other of said openings for detachably and firmly securing said bar to said standard.

References Cited in the file of this patent

UNITED STATES PATENTS

| | | |
|---|---|---|
| 459,364 | Kelley | Sept. 8, 1891 |
| 1,082,140 | Schonemann | Dec. 23, 1913 |
| 2,549,655 | Woodward | Apr. 17, 1951 |
| 2,815,862 | Einhorn | Dec. 10, 1957 |
| 2,836,306 | Einhorn | May 27, 1958 |
| 2,845,182 | Atkinson | July 29, 1958 |

FOREIGN PATENTS

| | | |
|---|---|---|
| 79,148 | Netherlands | Sept. 15, 1955 |